United States Patent
Fukushi et al.

(10) Patent No.: US 11,360,111 B2
(45) Date of Patent: Jun. 14, 2022

(54) CONNECTION MODULE AND INTERFERENCE AVOIDANCE METHOD

(71) Applicant: Hitachi High-Technologies Corporation, Tokyo (JP)

(72) Inventors: Yudai Fukushi, Tokyo (JP); Takamichi Mori, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 323 days.

(21) Appl. No.: 16/636,738

(22) PCT Filed: Aug. 23, 2018

(86) PCT No.: PCT/JP2018/031120
§ 371 (c)(1),
(2) Date: Feb. 5, 2020

(87) PCT Pub. No.: WO2019/044648
PCT Pub. Date: Mar. 7, 2019

(65) Prior Publication Data
US 2020/0217866 A1    Jul. 9, 2020

(30) Foreign Application Priority Data
Sep. 1, 2017 (JP) .............................. JP2017-168438

(51) Int. Cl.
*G01N 35/04* (2006.01)
*G01N 35/02* (2006.01)
*G01N 35/00* (2006.01)

(52) U.S. Cl.
CPC ....... *G01N 35/04* (2013.01); *G01N 35/00584* (2013.01); *G01N 35/025* (2013.01); *G01N 2035/0415* (2013.01)

(58) Field of Classification Search
CPC ............. G01N 35/04; G01N 35/00584; G01N 35/025; G01N 2035/0415;
(Continued)

(56) References Cited

U.S. PATENT DOCUMENTS 4,900,513 A * 2/1990 Barker ................... G01N 35/04
422/63
7,842,237 B1 * 11/2010 Shibuya ............... G01N 35/026
422/65
(Continued)

FOREIGN PATENT DOCUMENTS

JP    04-001571 A    1/1992
JP    09-043246 A    2/1997
(Continued)

OTHER PUBLICATIONS

International Search Report of PCT/JP2018/031120 dated Nov. 20, 2018.

*Primary Examiner* — Benjamin R Whatley
*Assistant Examiner* — Curtis A Thompson
(74) *Attorney, Agent, or Firm* — Mattingly & Malur, PC (57) ABSTRACT

Provided is a connection module with a high degree of freedom for an automatic analyzer which does not depend on a device as a discharge destination. For this purpose, a module to be connected to an automatic analyzer with a rack rotor mechanism includes: a rack discharge mechanism for moving a rack from the rack rotor mechanism to a rotation holder; a rack rotating mechanism for rotating the rack moved to the rotation holder; a conveyor mechanism for transporting the rack from the rack rotating mechanism to a discharge port; and a feeder mechanism for pushing the rack out of the rotation holder to the conveyor mechanism, in which the rack rotating mechanism rotates the rotation holder from a direction parallel to the rack discharge mecha-
(Continued)

nism to a direction parallel to the feeder mechanism and the conveyor mechanism in the selected rotation direction.

12 Claims, 10 Drawing Sheets

(58) Field of Classification Search
CPC ... G01N 2035/0441; G01N 2035/0465; G01N 35/0491
See application file for complete search history.

(56) References Cited

U.S. PATENT DOCUMENTS

| | | | |
|---|---|---|---|
| 8,828,319 B2* | 9/2014 | Tatsutani | G01N 35/04 422/65 |
| 2005/0013735 A1* | 1/2005 | Gebrian | G01N 35/025 422/63 |
| 2005/0214166 A1* | 9/2005 | Itoh | G01N 35/026 422/65 |
| 2012/0179405 A1* | 7/2012 | Yano | G01N 35/0092 702/85 |
| 2012/0216610 A1* | 8/2012 | Kanayama | G01N 35/1011 73/290 R |
| 2012/0269682 A1* | 10/2012 | Watanabe | G01N 35/00663 422/68.1 |

FOREIGN PATENT DOCUMENTS

| | | | |
|---|---|---|---|
| JP | 2003-262642 A | | 9/2003 |
| JP | 2003262642 A | * | 9/2003 |
| JP | 2008-122421 A | | 5/2008 |
| JP | 2008-281453 A | | 11/2008 |
| JP | 2012-132735 A | | 7/2012 |

* cited by examiner

CONNECTION MODULE AND INTERFERENCE AVOIDANCE METHOD

TECHNICAL FIELD

The present invention relates to a connection module which connects an automatic analyzer for analyzing the concentration or the like of a specific component in a liquid sample such as blood or urine and a specimen transport system or the like.

BACKGROUND ART

Automatic analyzers which divide a specimen such as blood or urine taken from a patient according to the inspection item and automate pretreatment, analysis, storage, and inspection result reporting to analyze a large quantity of specimen quickly are widely used. The automatic analyzers include immunoanalytical devices which test immune reaction and biochemical analyzers which analyze the components of blood or the like. In the recent years, various specimen transport systems which connect such different types of automatic analyzers to each other have been proposed in order to analyze a large quantity of specimen for many kinds of inspection items quickly.

The specimen transport system disclosed in Patent Literature 1 is configured so that a turntable on which only one rack can be placed is provided between one transport line for transporting a rack passed through one specimen processing unit in one direction and another transport line for transporting a rack toward another specimen processing unit in a direction perpendicular to the one transport line and the turntable is rotated to change the rack from the one direction to the perpendicular direction. In addition, the specimen holder transport device disclosed in Patent Literature 2 is configured so that an orientation detecting means for detecting whether the rack faces forward or backward is provided and the rack is rotated according to the result of detection by the orientation detecting means so as to keep the rack face forward in the moving direction.

CITATION LIST

Patent Literature

Patent Literature 1:
  Japanese Patent Application Laid-Open No. Hei 9(1997)-43246
Patent Literature 2:
  Japanese Patent Application Laid-Open No. 2012-132735

SUMMARY OF INVENTION

Technical Problem

Depending on the specimen transport system or other automatic analyzer as a rack discharge destination, it may specify whether the rack should face forward or backward when it receives the rack. Therefore, when the rack is discharged from the automatic analyzer, whether the rack faces forward or backward must be selectable according to the usage by the user.

Furthermore, recently the function to change the order of arrangement of racks according to the priority in analysis in an automatic analyzer has been known. One mechanism with this function is a rack rotor mechanism which rotates while holding a plurality of racks and orients a desired rack toward a rack transport mechanism. When the rack rotor mechanism is used as a section for taking the rack out of the automatic analyzer, in order to minimize the installation space for the rack rotor mechanism and a rack rotating mechanism, the distance between the rotation centers must be decreased to the extent that the rotating movements of the two rotating mechanisms do not interfere with each other.

In this case, if a rack exists between the two rotating mechanisms when the device is stopped, the rack and the two rotating mechanisms would interfere with each other, thereby making operation impossible, so interference avoidance operation is needed. The rack rotor mechanism is accessed by a plurality of rack transport mechanisms and the rack rotor mechanism cannot operate until interference by the accessing mechanisms and the rack is eliminated, which might complicate the interference avoidance operation. Therefore, it is desirable that the interference with the rack rotor mechanism should be eliminated promptly. Here, if the transport distance between the rack rotor mechanism and the rack rotating mechanism is increased and the rack is moved to an area between the two rotating mechanisms in order to eliminate the interference, the interference avoidance operation would be simplified but the space for installation of the connection module should be larger.

In addition, when the driving source of a rotating mechanism is a stepping motor, if the stepping motor becomes temporarily de-excited, due to the characteristics of the stepping motor, stop position deviation might occur at the moment when it is excited again. This deviation might result in a problem that if the rack is caught between the two rotating mechanisms and each rotating mechanism is forcedly moved in order to eliminate the interference, the sample placed in the rack spills or the mechanism is damaged. In order to improve the reliability of the device, it is necessary to reset the device safely and quickly. For this purpose, whether there is an interference or not should be grasped and the interference should be eliminated promptly so that each of the automatic analyzer and the connection module can perform recovery operation (resetting operation) independently.

An object of the present invention is to provide a connection module with a high degree of freedom which does not depend on a device as a discharge destination. Another object is to provide a highly reliable connection module for an automatic analyzer which minimizes the installation space by optimization of the arrangement of rotating mechanisms and enables resetting operation to be performed safely and quickly when the device is stopped.

Solution to Problem

The connection module to be connected to an automatic analyzer with a rack rotor mechanism includes: a rack discharge mechanism for moving a rack from the rack rotor mechanism to a rotation holder; a rack rotating mechanism for rotating the rack moved to the rotation holder; a conveyor mechanism for transporting the rack from the rack rotating mechanism to a discharge port; and a feeder mechanism for pushing the rack out of the rotation holder to the conveyor mechanism, in which the rack rotating mechanism rotates the rotation holder from a direction parallel to the rack discharge mechanism to a direction parallel to the feeder mechanism and the conveyor mechanism in a selected rotation direction.

The above and further objects and novel features of the invention will more fully appear from the following detailed description in this specification and the accompanying drawings.

Advantageous Effects of Invention

It is possible to provide a connection module with a high degree of freedom which does not depend on a device as a discharge destination.

DESCRIPTION OF EMBODIMENTS

Figure 7:
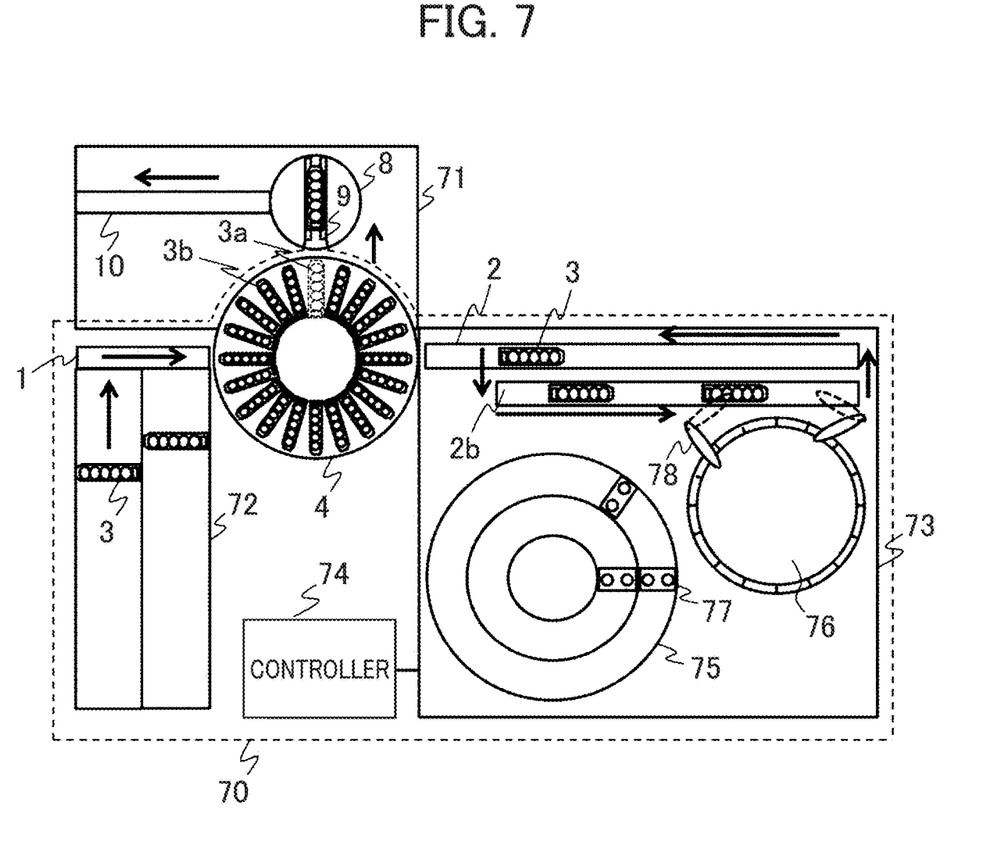
FIG. 7 is an overall view of the automatic analyzer to which the connection module is connected.

FIG. 7 is an overall view of an automatic analyzer 70 to which a connection module 71 is connected. The automatic analyzer 70 includes a specimen supplying section 72 and an analyzing section 73. A rack 3 which can house a plurality of specimen containers is transported from the specimen supplying section 72 into the analyzing section 73. The rack 3 is once transported into a rack rotor mechanism 4 by a rack transport mechanism 1 of the specimen supplying section 72. The rack rotor mechanism 4 is intended to change the order of transport of racks into the analyzing section 73, according to the priority in analysis in the automatic analyzer 70. The rack rotor mechanism 4 rotates while holding a plurality of racks and can orient a desired rack toward the rack transport mechanism. The rack to be subjected to analysis is transported from the rack rotor mechanism 4 into the analyzing section 73 by a rack transport mechanism 2, 2b and the rack for which analysis by the analyzing section 73 has ended is transported from the analyzing section 73 to the rack rotor mechanism 4 by the rack transport mechanism 2, 2b in the same way. The analyzing section 73 includes: a reagent disk 75 in which a reagent bottle 77 is loaded; a reaction disk 76 in which a reaction container is loaded; and a specimen dispensing mechanism 78 for dispensing a sample from a specimen container. A prescribed biochemical analysis is made by mixing the dispensed sample and reagent in the reaction container to make them react with each other and measuring the absorbance and scattered light of the mixed liquid of the sample and reagent in a measuring section (not shown in the figure).

The rack rotor mechanism 4 of the automatic analyzer 70 is connected to the connection module 71. The connection module 71 includes a rack rotating mechanism 8 for changing the orientation of the rack being transported and a conveyor mechanism 10, which will be detailed later. The connection module 71 is connected to the automatic analyzer 70 in order to discharge the rack for which analysis by the analyzing section 73 has ended, from the automatic analyzer 70 and transport it to a specimen transport system (not shown in the figure) or another automatic analyzer. In the connection module 71 in FIG. 7, the rack rotating mechanism 8 is arranged so as to take out a rack 3a placed perpendicularly to the rack transport mechanisms 1, 2, but instead the rack rotating mechanism 8 may be arranged so as to take, for example, a rack 3b out of the rack rotor mechanism 4 obliquely. If that is the case, the plane area of the connection module 71 can be decreased for space saving.

The operation of each mechanism of the automatic analyzer 70 and the connection module 71 (if the connection module is connected) is controlled by a controller 74 of the automatic analyzer 70. Although the controller 74 is shown as an external device in the figure, instead it may be built in the housing of the automatic analyzer 70.

Figure 1:
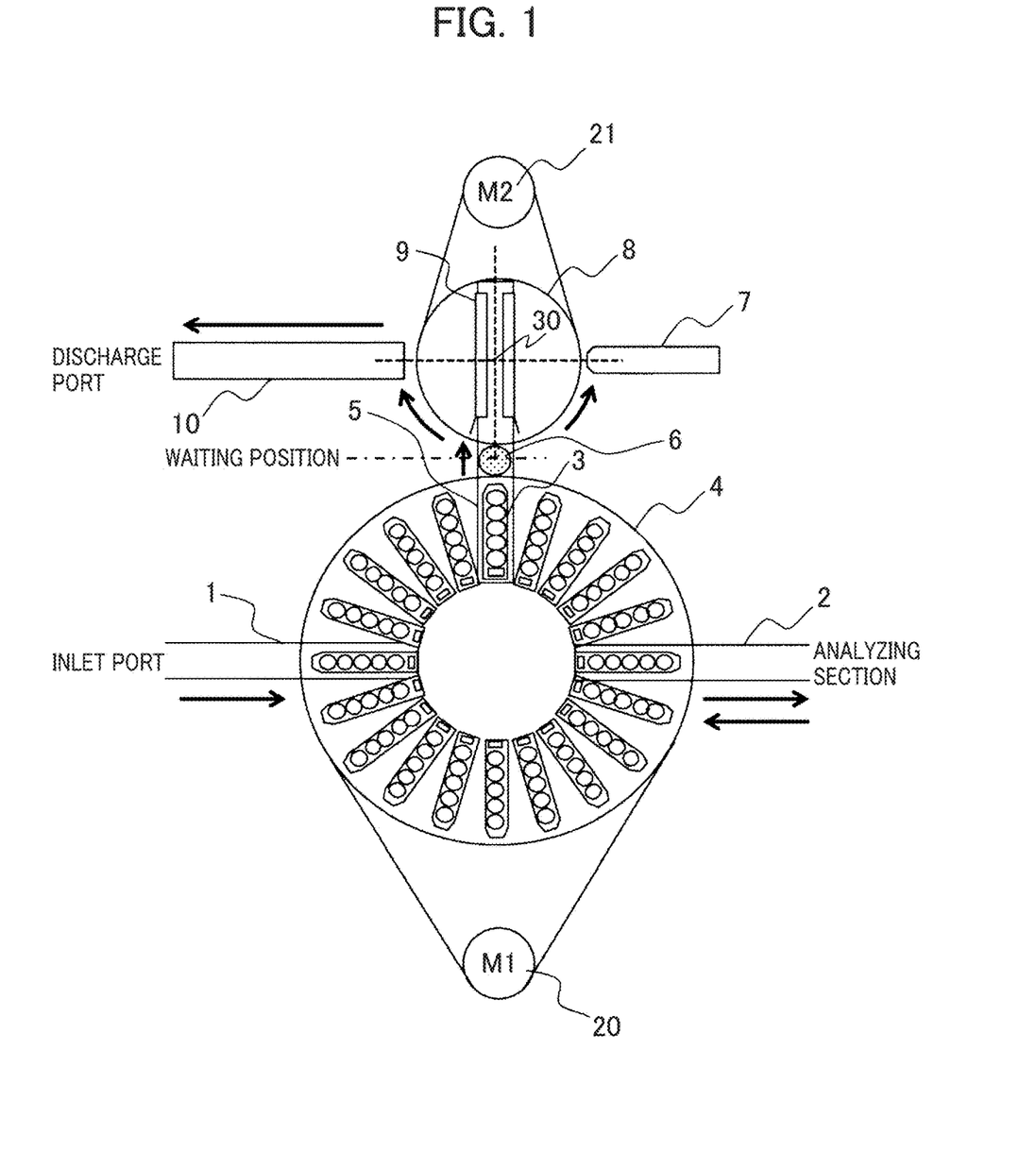
FIG. 1 is an enlarged plan view of the joint between an automatic analyzer and a connection module.

FIG. 1 is an enlarged plan view of the joint between the automatic analyzer and the connection module. In the rack rotor mechanism 4, slots for housing a rack 3 are arranged radially so that a plurality of racks 3 can be held at the same time. The rack rotor mechanism 4 is rotated by a rack rotor motor 20 to move the rack 3 as the object of transport to the rack transport mechanisms 1, 2 or move it to a position parallel to a rack discharge mechanism 5 of the connection module.

The rack rotating mechanism 8 of the connection module includes a rotation holder 9 for holding the rack 3 discharged from the rack rotor mechanism 4 by the rack discharge mechanism 5 and rotates the rack 3 around a rotation axis 30 to orient it toward a discharge port. The rack 3 oriented to move toward the discharge port is moved horizontally by a feeder mechanism 7 and pushed out to the conveyor mechanism 10. The conveyor mechanism 10 has a belt and moves the rack 3 transported onto an upper surface of the belt of the conveyor mechanism 10 by the feeder mechanism 7, to the discharge port.

Figure 2A:
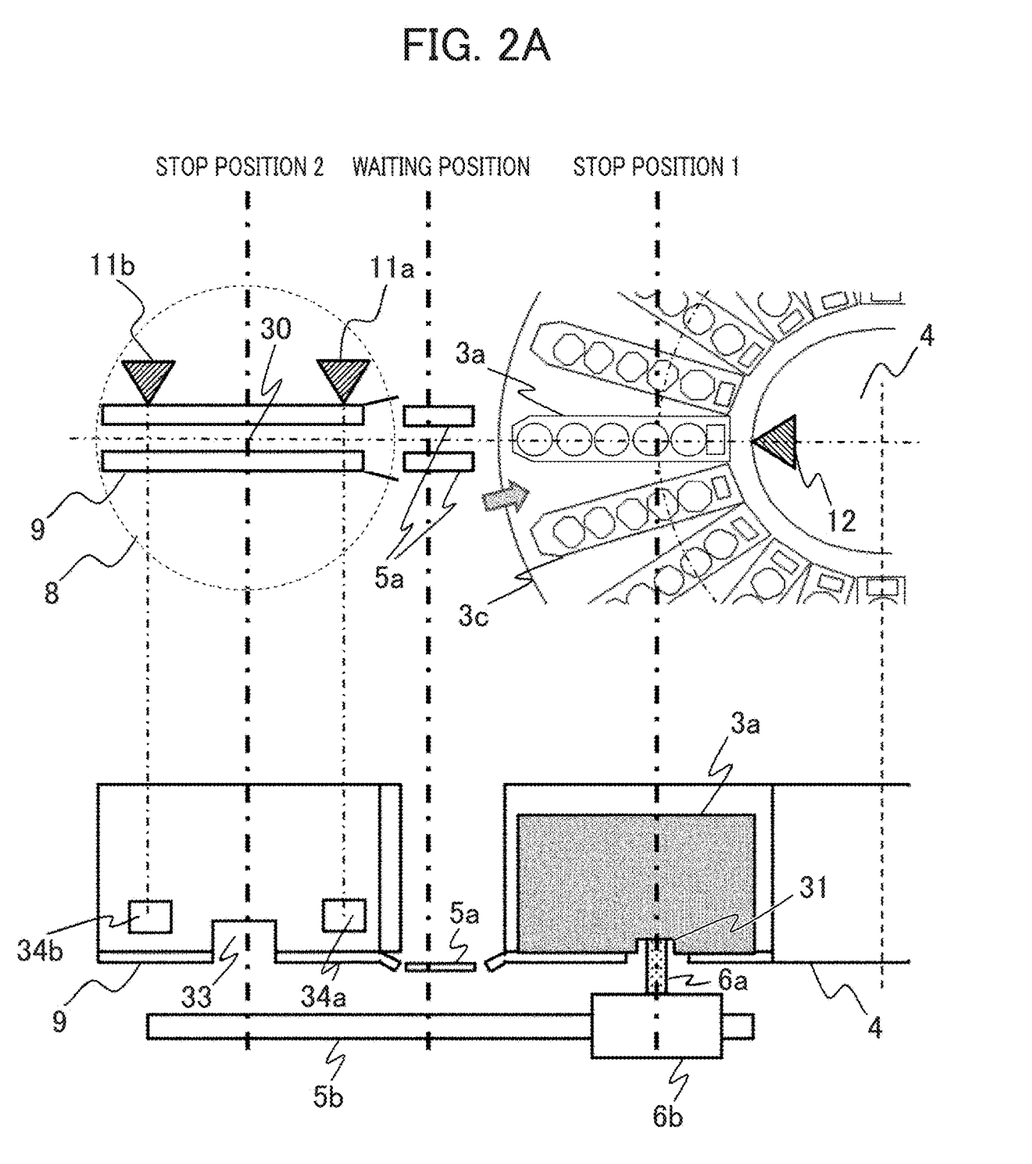
FIG. 2A is a sectional view of the main part of the joint between the automatic analyzer and connection module.
Figure 2B:
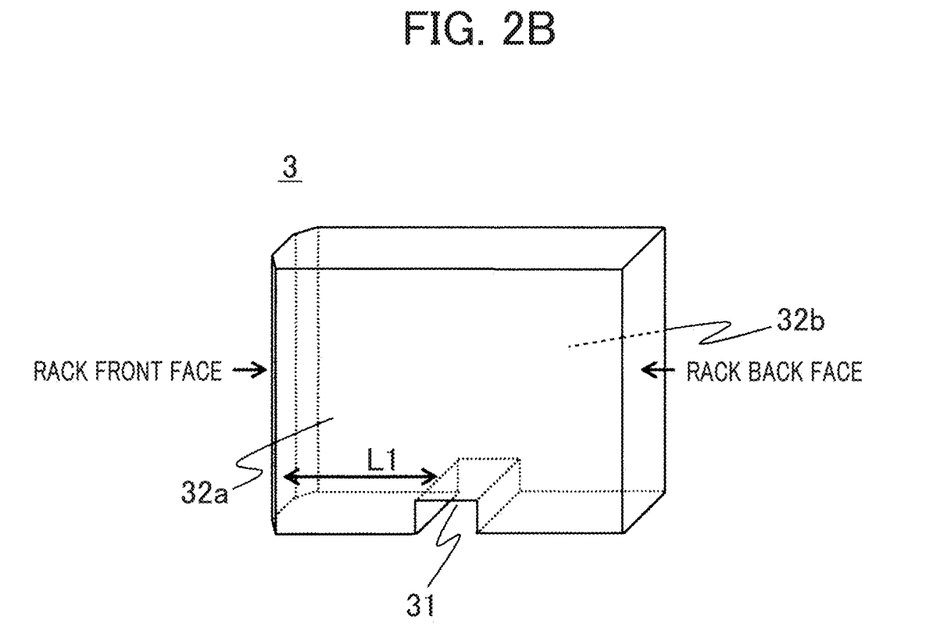
FIG. 2B is a bird's eye view (schematic diagram) of a rack.

FIG. 2A is a sectional view of the main part of the joint between the automatic analyzer and the connection module. FIG. 2B is a bird's eye view (schematic diagram) of the rack 3. As shown in FIG. 2B, the rack 3 has a concave part 31 penetrating both side faces 32a, 32b at its bottom.

As shown in FIG. 1, the rack discharge mechanism 5, which moves the rack 3 linearly between the rack rotor mechanism 4 and the rack rotating mechanism 8, is located between the rack rotor mechanism 4 and the rack rotating mechanism 8. As shown in FIG. 2A, the rack discharge mechanism 5 includes a rail 5a, a slider shaft 5b, and a carriage 6. The rail 5a is intended to support the rack 3 being transported from the rack rotor mechanism 4 to the rack rotating mechanism 8. The carriage 6 includes a slider 6b which moves on the slider shaft 5b, and a holding part 6a which is located on the slider 6b and is to be hooked to the concave part 31 of the rack 3. The holding part 6a of the carriage 6 is hooked to the concave part 31 at the bottom of the rack 3 and the carriage 6 is moved along the slider shaft 5b to move the rack 3 from the rack rotor mechanism 4 to the rack rotating mechanism 8. The shape of the rack 3 shown in FIG. 2B is an example and the part to be in contact with the holding part 6a of the carriage 6 (contact part) is not limited to the concave part at the bottom but it may be something on a side face 32 depending on the shape of the holding part 6a of the carriage 6.

The operation to move the rack 3 into and out of the automatic analyzer 70 is carried out in the following sequence. First, the rack 3 supplied from the inlet port is conveyed to a slot of the rack rotor mechanism 4 by the rack transport mechanism 1. The rack rotor mechanism 4 rotates until the rack 3 becomes parallel to the rack transport mechanism 2 and the rack 3 is taken out to the rack transport mechanism 2 and transported to the analyzing section 73. After dispensing of the sample loaded in the rack 3 is finished, the rack 3 is again moved to the rack rotor mechanism 4 by the rack transport mechanism 2. If there is a request for retesting, the rack 3 waits in the slot of the rack rotor mechanism 4 until the analysis result of the sample is obtained. When the analysis result is obtained or there is no request for retesting, the rack 3 is discharged from the rack rotor mechanism 4 by the rack discharge mechanism 5.

Details of the discharge operation are as follows. First, with the carriage 6 at a waiting position, the rack rotor mechanism 4 rotates so that the position (indicated by the arrow) between the rack 3a and rack 3c as shown in FIG. 2A becomes parallel to the rack discharge mechanism 5. In this state, the carriage 6 moves to stop position 1. After the carriage 6 moves to the stop position 1, the rack rotor mechanism 4 rotates so that the rack 3a as the object of transport becomes parallel to the rack discharge mechanism 5. This causes the carriage 6 to be hooked to the concave part 31 of the rack 3a. With the carriage 6 in contact with the concave part 31 of the rack 3a, the carriage 6 is moved to the position of the rotation axis 30 of the rack rotating mechanism 8 (stop position 2) to discharge the rack 3a from the rack rotor mechanism 4. At this time, the rotation holder 9 of the rack rotating mechanism 8 remains stopped in a position parallel to the rack discharge mechanism 5 and the rack 3a being discharged. The rack 3 moved to the rotation holder 9 is oriented toward the discharge port by rotation of the rack rotating mechanism 8. This causes the rotation holder 9 of the rack rotating mechanism 8 to be parallel to the feeder mechanism 7 and conveyor mechanism 10. As shown in FIG. 2A, a notch 33 is provided at the bottom of the rotation holder 9 in a manner to correspond to stop position 2. Therefore, with the rack 3a oriented toward the discharge port, the notch 33 of the rotation holder 9 faces the rail 5a. Consequently, the carriage 6 can be moved from the position (stop position 2) of the rotation axis 30 of the rack rotating mechanism 8 through the notch 33 to the waiting position between the rack rotor mechanism 4 and the rack rotating mechanism 8. As the carriage 6 leaves the rack 3a, the feeder mechanism 7 moves horizontally and pushes the rack 3a from the rotation holder 9 to the conveyor mechanism 10 and the rack 3a placed on the conveyor mechanism 10 is transported to the discharge port by the belt.

Here, depending on the specimen transport system or other automatic analyzer as the discharge destination for the rack 3, the device may specify whether the rack should face forward or backward when it receives the rack 3 from the connection module 71. Therefore, if the connection module 71 determines whether the rack 3 faces forward or backward at the discharge port, connection might be impossible depending on the connection destination. For this reason, whether the rack 3 faces forward or backward at the discharge port must be selectable according to the usage by the user. In this embodiment, whether the rack 3 faces forward or backward at the discharge port is determined by the direction of rotation of the rack rotating mechanism 8, so this can be achieved by making the direction of rotation of the rack rotating mechanism 8 arbitrarily selectable. Consequently, a connection module with a high degree of freedom which does not depend on the device as the discharge destination can be realized.

Figure 3A:
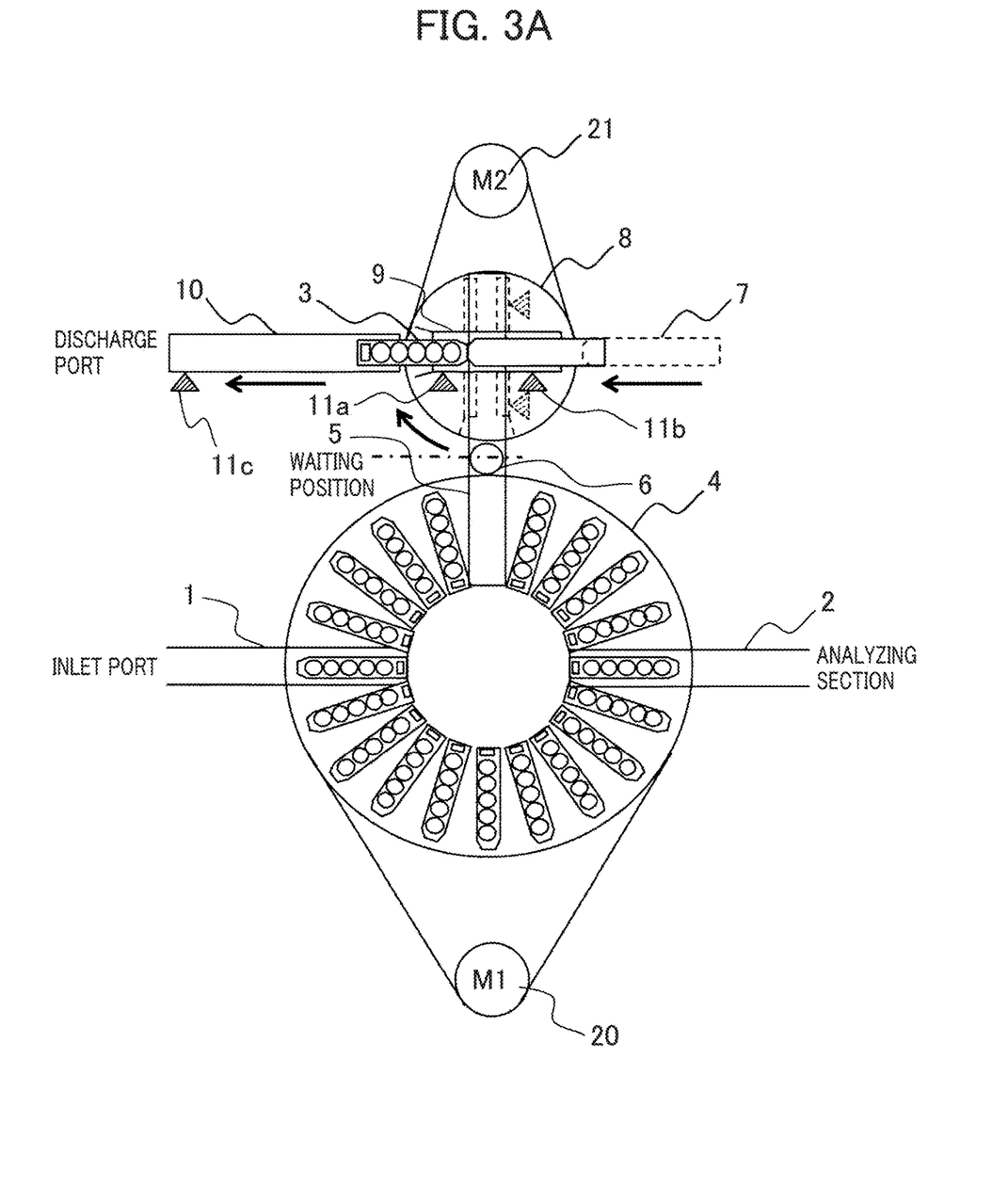
FIG. 3A is a schematic diagram which explains rack discharge operation.

Referring to FIG. 3A, an explanation will be given below of the process in which the rack rotating mechanism 8 is rotated clockwise 90 degrees from its stop position at a right angle to the conveyor mechanism 10 to become parallel to the conveyor mechanism 10 and discharge the rack 3.

After the rack 3 is transported to the rotation holder 9 of the rack rotating mechanism 8 by the rack discharge mechanism 5, a rack detector 11b checks whether the rack 3 has moved into the rotation holder 9 normally. The rack detector 11 includes, for example, a light source such as an LED and a light detector. As shown in FIG. 2A, a window 34 is provided in an area of the rotation holder 9 which faces the rack detector 11. In the rack detector 11, the light source is made to emit light and the light detector detects the light reflected after hitting an object, in order to decide whether there is an object or not. If the rack 3 has not moved to the rotation holder 9 normally, the light from the rack detector 11 is transmitted through the window 34 and no reflected light is detected. On the other hand, if the rack 3 has moved to the rotation holder 9 normally, the light from the rack detector 11 is reflected by the rack 3 and the light detector detects the reflected light. In this case, if the rack detector 11b, located on the remoter side in the movement of the rack 3 to the rack rotating mechanism 8, confirms the existence of the rack 3, it can be determined with certainty that the rack 3 has been transported. After confirming that the rack 3 has been normally moved into the rotation holder 9, the rotation holder 9 is rotated clockwise 90 degrees toward the discharge side.

As the next step, a request telling the hope to deliver the rack 3 is sent from the connection module 71 to the specimen transport system or other automatic analyzer as the connection destination and after receiving a reply from the device as the connection destination that it can receive, the feeder mechanism 7 moves toward the conveyor mechanism 10 to send the rack 3 to the conveyor mechanism 10. The rack detector 11a can check whether the rack 3 has been pushed out to the conveyor mechanism 10 normally by the feeder mechanism 7. Specifically, when the rack detector 11a becomes unable to confirm the existence of the rack 3, it can be determined that the rack 3 has moved to the conveyor mechanism 10 normally. The conveyor mechanism 10 transports the rack 3 with the back face of the rack 3 frontward in the moving direction and when the rack detector 11c located before the discharge port detects the rack 3, the transport motion of the conveyor mechanism 10 is stopped. Then, after confirming the validity of the reply from the device as the connection destination that it can receive, the conveyor mechanism 10 is again activated to deliver the rack 3 to the device as the connection destination.

Alternatively, a request telling the hope to deliver the rack 3 may be sent from the connection module 71 after the rack 3 is moved to near the discharge port. In this case, the time period from the issuance of the request to receive the rack 3 until transport to the discharge port by the belt can be shortened.

Figure 3B:
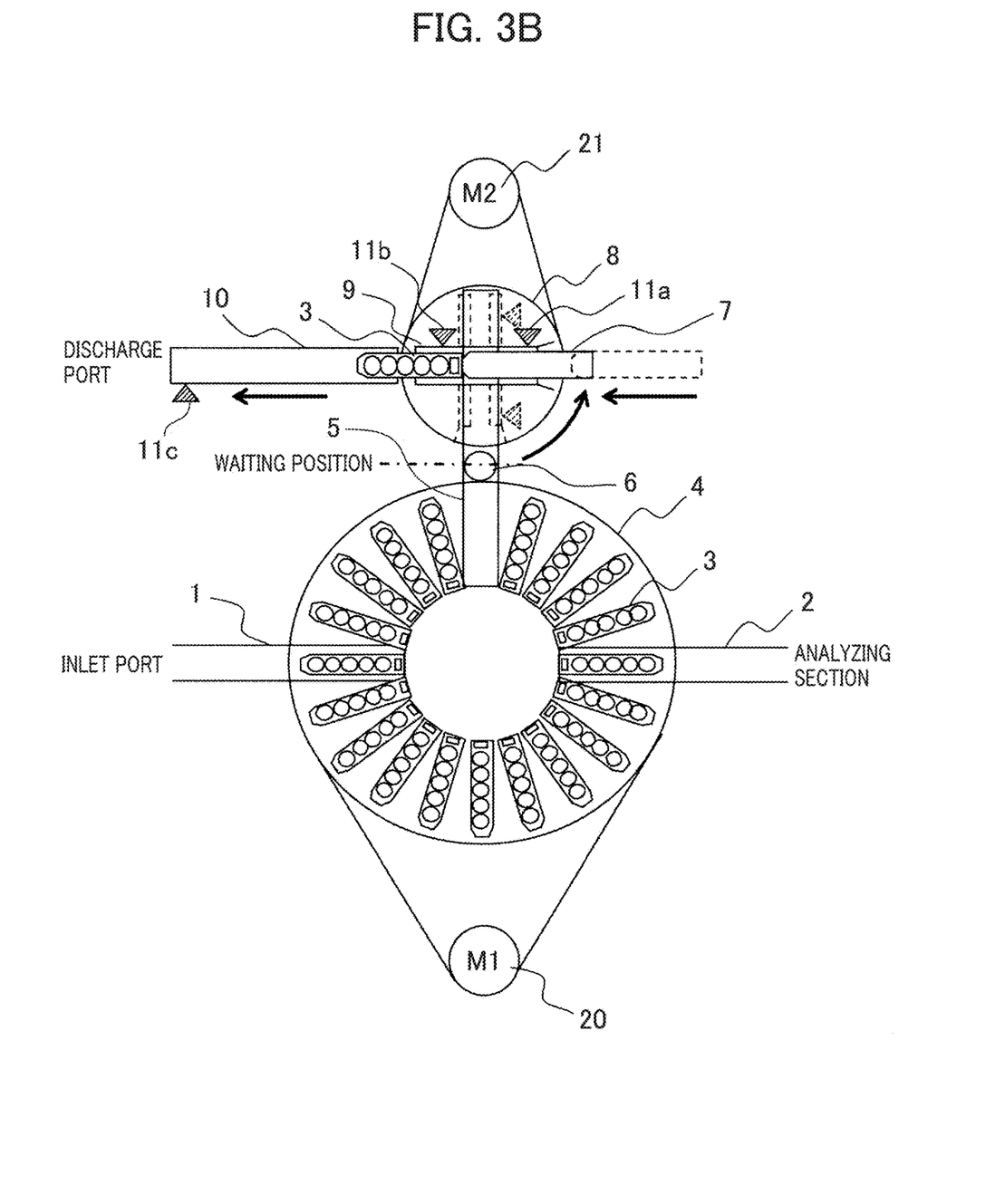
FIG. 3B is a schematic diagram which explains rack discharge operation.

Next, referring to FIG. 3B, an explanation will be given of the operation to discharge the rack 3 when the rack rotating mechanism 8 is rotated counterclockwise 90 degrees. In the same way as when it is rotated clockwise, after the rack 3 is transported to the rotation holder 9 of the rack rotating mechanism 8 by the rack discharge mechanism 5, the rack detector 11b checks whether the rack 3 has moved into the rotation holder 9 normally or not. After it is confirmed that the rack 3 has been moved into the rotation holder 9 normally, the connection module 71 sends a request telling the hope to deliver the rack from the connection module 71 to the specimen transport system or other automatic analyzer as the connection destination and waits. After receiving a reply from the device as the connection destination that it can receive, the rack rotating mechanism 8 rotates. As the rack rotating mechanism 8 rotates counterclockwise 90 degrees, the front face of the rack 3 is oriented toward the discharge port. The face of the rack 3 which faces the rack rotating mechanism 8 when the rack 3 is discharged from the rack rotor mechanism 4 is defined as the front face and the face which faces the rack rotor mechanism 4 is defined as the back face and the distance between the front face and the back face is called the overall length. The rack 3 in this state is moved to the conveyor mechanism 10 and in this case, the rack detector 11b checks whether the rack 3 has been pushed out to the conveyor mechanism 10 normally by the feeder mechanism 7.

The rack 3 is transported by the conveyor mechanism 10 with the front face of the rack 3 frontward in the moving direction and as the rack detector 11c located before the discharge port detects the rack 3, the transport motion of the conveyor mechanism 10 is stopped. Then, after confirming the validity of the reply from the device as the connection destination that it can receive, the conveyor mechanism 10 is again activated to deliver the rack 3 to the device as the connection destination.

Whether the rotation direction of the rack rotating mechanism 8 should be clockwise or counterclockwise can be selected on the operation screen (not shown) of the automatic analyzer 70. The rack detectors 11a and 11b, which check the rotation direction of the rack rotating mechanism 8 and whether the rack 3 has moved from the rotation holder 9 normally or not, are correlated by software so that when the rack rotation direction is selected through the operation screen, the rack detector 11 to be used for judgment is automatically determined.

Next, an explanation will be given of the structure which enables the rack rotor mechanism 4 of the automatic analyzer 70 and the rack rotating mechanism 8 of the connection module 71 to be located close to each other in order to minimize the installation space.

In discharging the rack 3, while the rack discharge mechanism 5 is moving to hook the carriage 6 in order to discharge the rack 3 in the rack rotor mechanism 4 or while it is discharging the rack from the rack rotor mechanism 4, if the device stops for some reason, the movable part of each mechanism will be in an uncertain position and thus the operation to reset the device will be needed.

In resetting operation of the automatic analyzer 70 with the rack rotor mechanism 4, generally the racks in the device are once collected in a housing and in that case, in order to move the rack 3 to the housing through the rack transport mechanisms 1, 2, the rack rotor mechanism 4 must be operable. At this time, if the rack 3 or a mechanism such as the carriage 6 is in a position that interferes with the rack rotor mechanism 4, the rack rotor mechanism 4 cannot rotate. In this case, it is necessary that the interference between the mechanisms or between the rack and mechanisms should be eliminated and the automatic analyzer 70 and the connection module 71 should perform interference avoidance operation to become freely operable.

For example, in the structure shown in FIG. 1 and FIG. 2A, if the distance between the outer circumferences of the rack rotor mechanism 4 and rack rotating mechanism 8 is not less than the overall length of the rack 3 to be transported (namely the rail 5a having a length not less than the overall length of the rack 3) and a waiting position is provided for the rack discharge mechanism 5 at a position that does not interfere with the two rotating mechanisms even with the rack 3 held by the carriage 6, then when performing the interference avoidance operation, by moving the carriage 6 to the waiting position, it is guaranteed that the automatic analyzer 70 and the connection module 71 are freely operable. However, if the waiting position is provided as mentioned above, the movement distance of the rack discharge mechanism 5 should be longer, which would not only take a longer time to discharge the rack 3 but also require a larger installation space.

Figure 4:
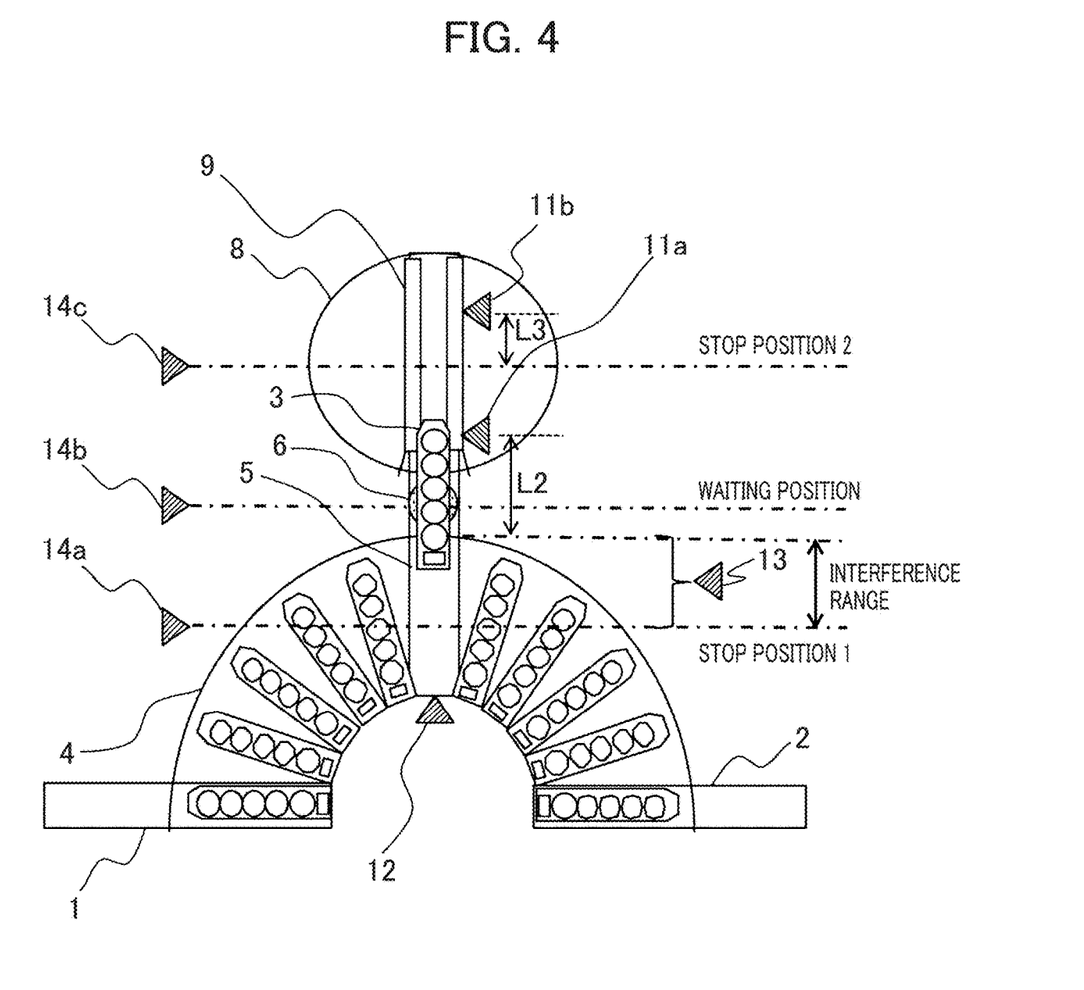
FIG. 4 is a schematic diagram which explains the arrangement of detectors and interference avoidance operation.

On the other hand, in the structure according to the embodiment, the rail 5a has a length less than the overall length of the rack 3 and when the carriage 6 holds the rack 3, even if the carriage 6 moves to the waiting position, the rack 3 causes interference between the rack rotor mechanism 4 and the rack rotating mechanism 8. Referring to FIG. 4, the interference avoidance operation in the structure in FIG. 1 will be explained.

First of all, in order to perform the interference avoidance operation, a detector (sensor) is provided to detect the carriage 6 and rack 3. First, referring to FIG. 2A as well, an explanation is given of the positions at which the carriage 6 stops in normal operation. The waiting position, which is provided between the rack rotor mechanism 4 and the rack rotating mechanism 8, is the position where the carriage 6 waits when discharging operation of the rack 3 is not performed. The stop position 1 is the position where the carriage 6 performs the motion of hooking (holding motion) to the concave part of the rack 3 as the object of discharge in the rack rotor mechanism 4. The stop position 2 is the position where the carriage 6 discharges the rack 3 and stops in the rack rotating mechanism 8 and coincides with the rotation axis 30 of the rack rotating mechanism 8. As shown in FIG. 4, there are provided a stop position detector 14b to detect that the carriage 6 has stopped at the waiting position, a stop position detector 14a to detect that the carriage 6 has stopped at the stop position 1, and a stop position detector 14c to detect that the carriage 6 has stopped at the stop position 2. In addition, there are provided an interference detector 13 to detect that the carriage 6 is present in the range of interference between the rack rotor mechanism 4 and the rack discharge mechanism 5 and a rack detector 12 to check whether the rack exists in the slot or not when the slot of the rack rotor mechanism 4 becomes parallel to the rack discharge mechanism 5. Specifically, the range in which the carriage 6 causes interference between the rack rotor mechanism 4 and the rack discharge mechanism 5 is the range from the stop position 1 to the outer circumference of the rack rotor mechanism 4.

In order for each mechanism to be reset from an uncertain position, whether the carriage 6 and the rack 3 are in the interference range or not must be judged and the detectors are arranged so that the area where the carriage 6 is stopped and whether there is an interference by the rack 3 or not can be checked.

Figure 5:
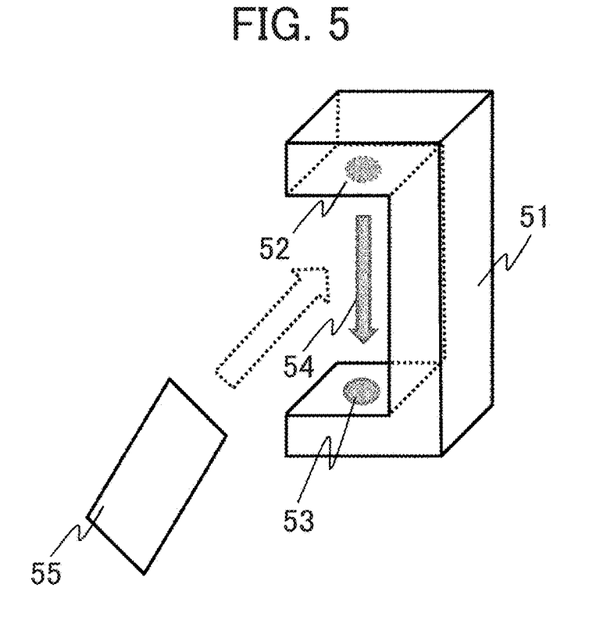
FIG. 5 shows an example of the structure of a carriage detector (schematic diagram).

These detectors may include a light source such as an LED or and a light detector, like the rack detectors 11. As in the rack detector 11, in the rack detector 12, the light source is made to emit light and the light detector detects the light reflected after hitting the rack in order to judge whether the rack exists or not. FIG. 5 shows an example of the structure of the carriage detectors 13 and 14 (the "stop position detectors" and "interference detector" are also collectively called "carriage detectors"). As shown in FIG. 5, a light source 52 and a light detector 53 are located on an outer frame 51 in a manner to face each other so that the existence of the carriage 6 is detected according to whether the light 54 from the light source 52 is shielded or not. The interference detector 13 has a range of areas in which it can detect the carriage 6. In this case, for example, by providing a shielding plate 55 with a prescribed length with respect to the carriage 6, the interference detector 13 can detect that the carriage 6 exists in the prescribed interference range.

With the above arrangement of the detectors, when the carriage 6 is stopped at the stop position 1, the stop position detector 14a detects it. When the carriage 6 is stopped in the interference range, the interference detector 13 detects it. When the carriage 6 is at the waiting position, the stop position detector 14b detects it. Regarding the area from the waiting position to the stop position 2, when the carriage detectors 13 and 14 are OFF (the carriage 6 is not detected), it can be determined that the carriage 6 is stopped in that area. When the carriage 6 is stopped at the stop position 2, the stop position detector 14c detects it.

Regarding the rack, first, when a rack before moving is present in a slot of the rack rotor mechanism 4, the rack detector 12 detects it. From the viewpoint of detecting interference between the rack 3 and the rack rotor mechanism 4, even if the carriage 6 moves and goes out of the interference range and the carriage 6 is, for example, at the waiting position as shown in FIG. 4, the rack 3 interferes with the rack rotor mechanism 4. Therefore, even if the carriage 6 moves and goes out of the interference range, whether the rack 3 is held or not must be detected. For this reason, the rack detector 11a is located in a position where the rack 3 can be detected before the carriage 6 goes out of the interference range for the interference detector 13. For this purpose, when the distance from the concave part 31 of the rack 3 to the front face of the rack is expressed by L1 (see FIG. 2B) and the distance between the outer circumference of the rack rotor mechanism 4 and the rack detector 11a is expressed by L2 (see FIG. 4), the relation L2≤L1 should hold. Whether the rack 3 exists from the waiting position to the stop position 2 or not is detected by the rack detectors 11a, b. As described above, in order for the rack detector 11b to determine that the rack 3 has been normally transported into the rotation holder 9, when the distance between the rotation axis 30 (stop position 2) of the rack rotating mechanism 8 and the rack detector 11b is expressed by L3 (see FIG. 4), the relation L3≤L1 should hold.

Regarding resetting operation of the automatic analyzer 70 and the connection module 71, when each of them can be operated independently, resetting operation can be performed simultaneously, so the time period until their recovery can be shortened. To do so, it is important that the automatic analyzer 70 and the connection module 71 should be separated at an early stage and particularly the rack rotor mechanism 4 of the automatic analyzer 70 in which transport mechanisms are concentrated should be first made freely operable.

Figure 6:
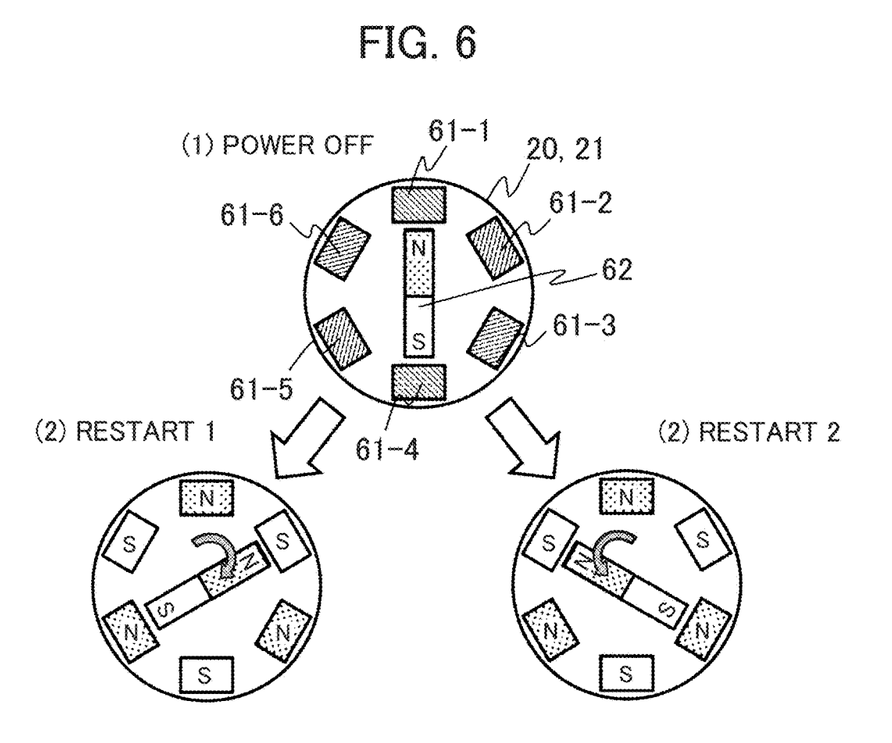
FIG. 6 is a diagram which explains positional deviation which occurs when the power to the device turns off.

Furthermore, while the rack is discharged from the rack rotor mechanism 4 to the rack rotating mechanism 8, if the power to the device turns off due to a lightning strike, electric outage or emergency stop and then the device is restarted, the stop positions of the two rotating mechanisms may be deviated, causing the rack 3 to be caught between them. The reason for this is as follows: when the power to the device turns off, the stepping motor 20 of the rack rotor mechanism 4 and the stepping motor 21 of the rack rotating mechanism 8 are once de-excited and when restarting, they are again excited, and because of the stepping motor structure, movement to stable positions occurs, thereby causing deviation of the stop positions. This is explained below, referring to FIG. 6. FIG. 6 is a schematic diagram of a stepping motor. The stepping motor is rotated as the north poles and south poles of stators 61-1 to 61-6 are switched at high speed and an attractive force and a repulsive force are exerted between them and a rotor 62. When the power is off (1), the magnetic poles of the stators are lost and the orientation of the rotor 62 is uncertain. Upon restart (2), the rotor 62 shifts to a stable position, but this depends on the last state and it is not guaranteed that the rotor 62 returns to the position before the power turns off. For example, as in the example in FIG. 6, clockwise rotation may lead to stabilization or counterclockwise rotation may lead to stabilization. The amount of deviation in the rack delivery position depends on the motor resolutions of the rack rotor motor 20 and the rack rotating mechanism motor 21 in the mechanisms, and if the delivery area between the slot of the rack rotor mechanism 4 and the rotation holder 9 is narrower than the width of the rack 3 to be transported, the rack may be caught between them and become unable to be moved normally. Even in the case that such deviation occurs, the rack must be able to be transported normally.

A typical method for resolving the deviation of stop positions is to move the mechanism to the original position before operation of the mechanism by origin return operation (once returning the position of the mechanism to the home position). In the structure in FIG. 4, if the rack interferes between the two rotating mechanisms, the rack is moved to the stop position 1 or stop position 2 to avoid the interference and origin return operation is performed to resolve the deviation of the stop positions of the rotating mechanisms; at this time, regarding which stop position the rack should be moved to, if the rack is moved to the side of the mechanism for which the amount of deviation from the position before the power turns off is larger, collision of the rack or collision of the carriage might damage the mechanism, so it is desirable to move it to the side of the mechanism for which the amount of deviation is smaller.

Figure 8:
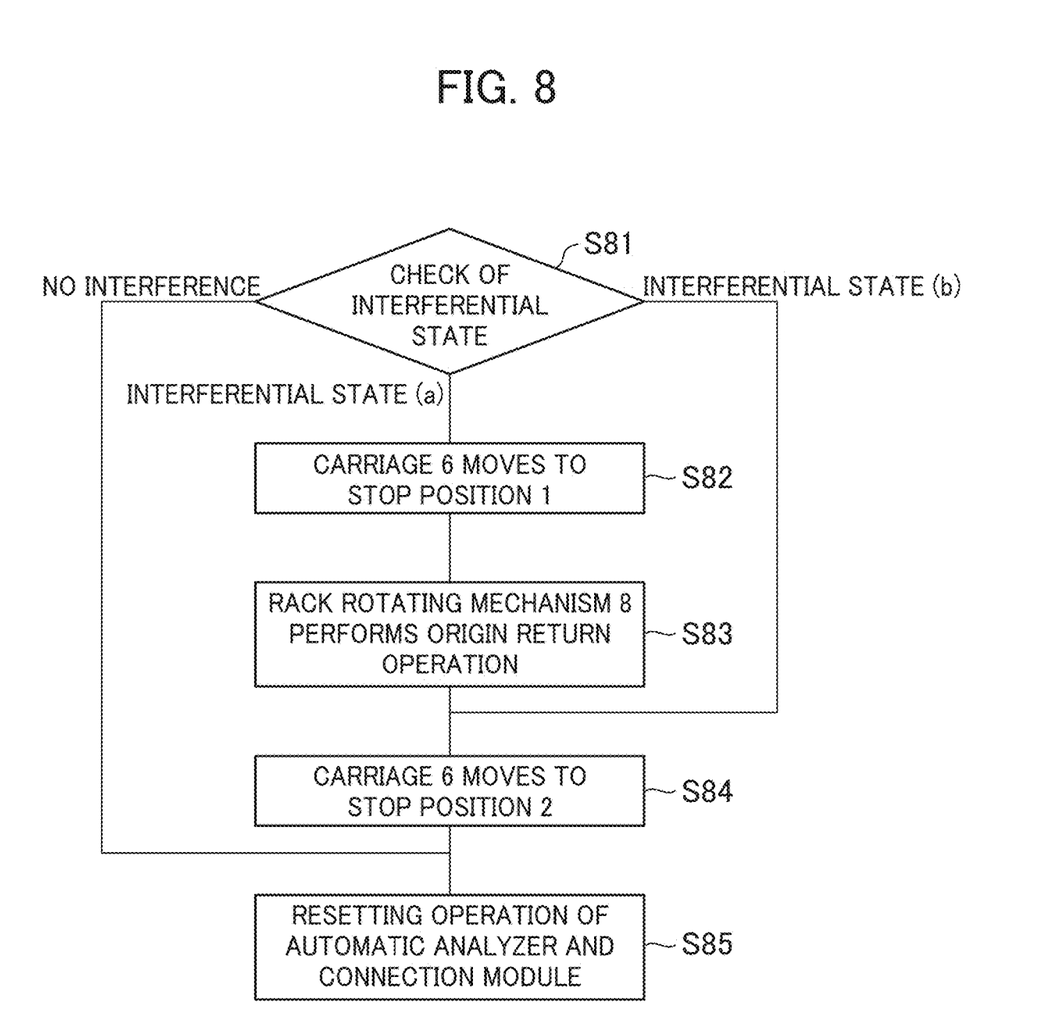
FIG. 8 shows an example of the interference avoidance operation flow.

FIG. 8 shows an example of the interference avoidance operation flow which is performed by the controller 74. First, whether the rack discharge mechanism 5 and the rack rotor mechanism 4 are in an interferential state or not is checked or if they are in an interferential state, the interferential state is checked (S81). The interferential states are divided into two types: the state in which the carriage 6 is present in the rack rotor mechanism 4 (interference detector 13 ON) is called "interferential state (a)" and the state in which the carriage 6 is stopped between the waiting position and the stop position 2 and the carriage 6 holds the rack 3 (rack detector 11a ON) is called "interferential state (b)".

If the rack discharge mechanism 5 and the rack rotor mechanism 4 are not in an interferential state, the automatic analyzer 70 and the connection module 71 each perform resetting operation (S85). If the rack rotor mechanism 4 is in an interferential state, operation to avoid the interference must be performed. In the interferential state (a), the carriage 6 is moved to the stop position 1 regardless of whether the rack exists or not (S82). Since this ensures that the rack rotating mechanism 8 can rotate freely, the rack rotating mechanism 8 performs origin return operation (S83). Consequently, the rack rotating mechanism 8 and the slot of the rack rotor mechanism 4 become parallel to each other, so the carriage 6 and rack 3 can move to the stop position 2 on the side of the rack rotating mechanism 8 without collision of the rack 3, the rack rotating mechanism 8, and the carriage 6 (S84), and the automatic analyzer 70 and the connection module 71 can be separated. On the other hand, in the interferential state (b), the carriage 6 is moved to the stop position 2 (S84). This eliminates the interference of the rack rotor mechanism 4, permitting rotation.

In the interference avoidance operation flow in FIG. 8, in the case of the interferential state (a), the carriage 6 is moved to the stop position 1 regardless of whether the rack exists or not, the rack 3 is once housed in the slot of the rack rotor mechanism 4 and the origin return operation for the rack rotating mechanism 8 is performed, so the interference avoidance operation cannot be performed in a short time. In order to perform the interference avoidance operation in a shorter time, in the interference avoidance operation flow shown in FIG. 9, the carriage 6 (and the rack 3) is moved outside the rack rotor mechanism 4. The controller 74 also performs the interference avoidance operation flow shown in FIG. 9.

Figure 9:
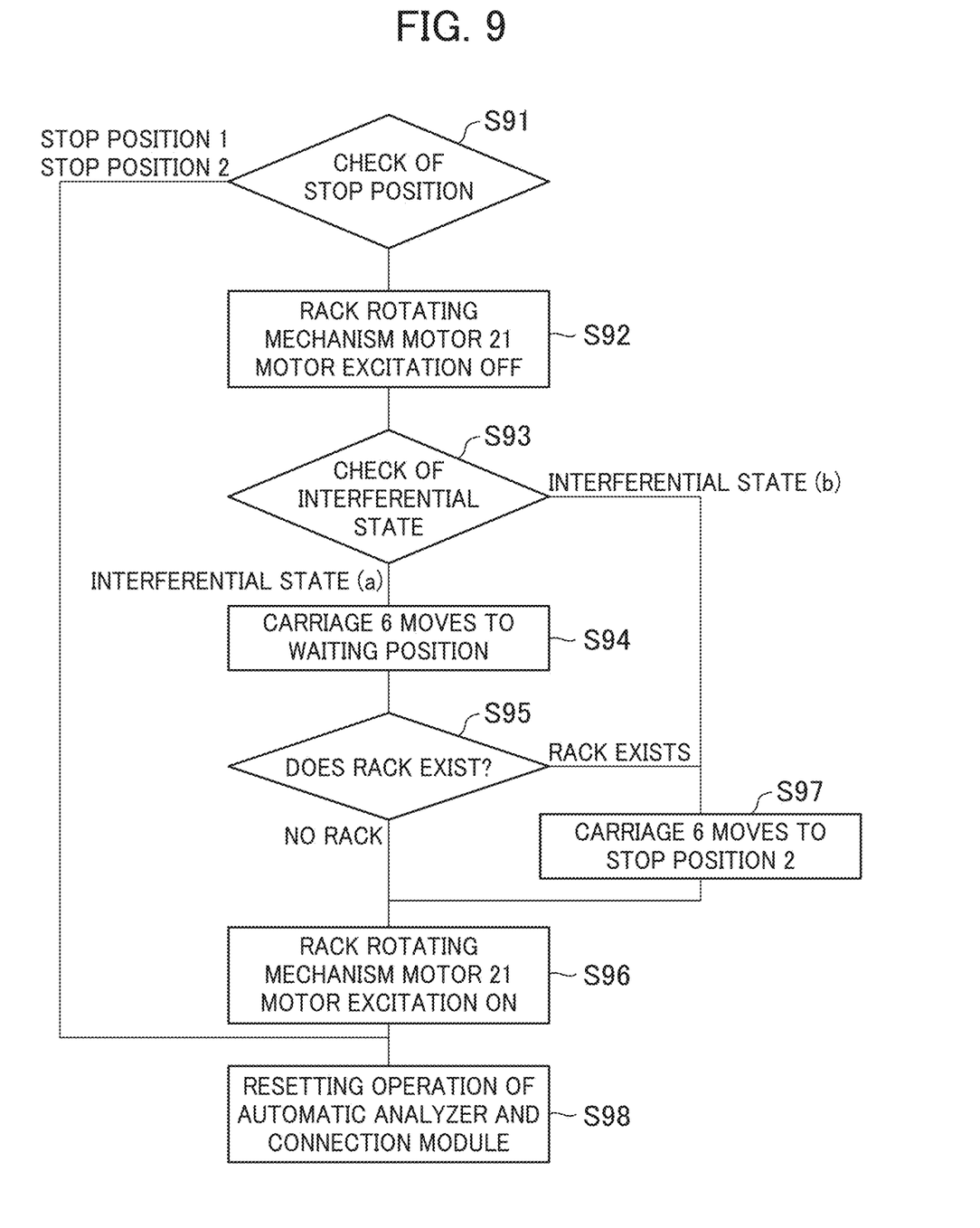
FIG. 9 shows another example of the interference avoidance operation flow.

First, the position at which the carriage 6 is stopped is checked by the stop position detectors 14a and 14c (S91). If the carriage 6 is at the stop position 1 or the stop position 2, it is guaranteed that there is no interference with the rack rotor mechanism 4 and the rack rotating mechanism 8 and thus resetting operation of the automatic analyzer 70 and the connection module 71 is performed (S98).

If it is determined that the carriage 6 is neither at the stop position 1 nor at the stop position 2, the excitation of the rack rotating mechanism motor 21 is turned OFF (S92). This step is intended to move the carriage 6 or the rack 3 without collision against the rack rotating mechanism. By turning off the excitation of the motor 21 of the rack rotating mechanism 8, the holding force of the rotation holder 9 in the rotation direction is eliminated and the rotation holder 9 is moved as the carriage 6 holding the rack 3 moves to the stop position 2, so that even if the rack 3 gets caught as mentioned above, the carriage 6 can be moved and the rack 3 can be transported normally.

After that, the interferential state is checked (S93). In the case of the interferential state (a), the carriage 6 is moved to the waiting position (S94). The sensor state of the rack detector 11a is checked to see whether the carriage 6 holds the rack 3 or not (S95). If it is decided that there is no rack, it is guaranteed that there is no interference with the rack rotor mechanism 4 and the rack rotating mechanism 8 and thus the excitation of the rack rotating mechanism motor 21 is turned ON (S96).

If it is determined that the rack exists, the carriage 6 is moved to the stop position 2 with the excitation of the motor 21 of the rack rotating mechanism 8 being OFF (S97). On the other hand, even in the interferential state (b), the carriage 6 is moved to the stop position 2 (S97). Since the excitation of the motor 21 of the rack rotating mechanism 8 is OFF, there is no problem with the movement. Since this ensures that there is no interference with the rack rotor mechanism 4 and the rack rotating mechanism 8, the excitation of the rack rotating mechanism motor 21 is turned ON (S96).

With the above process, the automatic analyzer 70 and the connection module 71 are separated and each of them can perform resetting operation. In the interference avoidance operation flow in FIG. 9, the interference avoidance operation can be performed more safely and in a shorter time.

The invention made by the present inventor has been so far explained concretely in reference to the embodiment thereof. However, the invention is not limited to the above embodiment and these details may be modified in various ways without departing from the gist thereof. For example, the interference avoidance operation between the automatic analyzer and connection module has been explained as an example, but the invention is a technique which can be widely applied to mechanisms which move between a rotating mechanism and another rotating mechanism. The number of rotating mechanisms is not limited to two but the advantageous effect can be obtained even when a further rotating mechanism is added. For example, it is possible to configure a system in which three or more rotating mechanisms are disposed in a manner not to be aligned in a straight line in order to reduce the installation space and resetting operation can be performed at high speed.

LIST OF REFERENCE SIGNS

1 . . . rack transport mechanism,
2, 2b . . . rack transport mechanism,
3 . . . rack,
4 . . . rack rotor mechanism,
5 . . . rack discharge mechanism,
5a . . . rail,
5b . . . slider shaft,
6 . . . carriage,
6a . . . holding part,
6b . . . slider,
7 . . . feeder mechanism,
8 . . . rack rotating mechanism,
9 . . . rotation holder,
10 . . . conveyor mechanism,
11a, 11b, 11c, 12 . . . rack detector,
13 . . . interference detector (carriage detector),
14a, 14b, 14c . . . stop position detector (carriage detectors),
20 . . . rack rotor motor,
21 . . . rack rotating mechanism motor,
30 . . . rotation axis,
31 . . . rack concave part,
32 . . . rack side face,
33 . . . rotation holder notch,
34 . . . rotation holder window,
51 . . . carriage detector outer frame,
52 . . . light source,
53 . . . light detector,
54 . . . light,
55 . . . shielding plate,
61 . . . stator,
62 . . . rotor,
70 . . . automatic analyzer,
71 . . . connection module,
72 . . . specimen supplying section,
73 . . . analyzing section,
74 . . . controller,
75 . . . reagent disk,
76 . . . reaction disk,
77 . . . reagent bottle,
78 . . . specimen dispensing mechanism

The invention claimed is:

1. A connection module to be connected to an automatic analyzer with a rack rotor mechanism, comprising:
a rack discharge mechanism for moving a rack from the rack rotor mechanism to a rotation holder;
a rack rotating mechanism for rotating the rack moved to the rotation holder;
a conveyor mechanism for transporting the rack from the rack rotating mechanism to a discharge port; and
a feeder mechanism for pushing the rack out of the rotation holder to the conveyor mechanism, wherein the rack rotating mechanism rotates the rotation holder in a selected rotation direction from a direction parallel to the rack discharge mechanism to a direction parallel to the feeder mechanism and the conveyor mechanism, the rack discharge mechanism includes: a rail for supporting the rack under movement from the rack rotor mechanism to the rotation holder; a slider shaft; and a carriage, the carriage including: a slider to slide on the slider shaft; and a holding part located on the slider to hold the rack, and a length of the rail is shorter than an overall length of the rack.

2. The connection module according to claim 1, comprising:
a first rack detector, wherein
the rack has a contact part to come into contact with the holding part of the carriage, and when a face which faces the rack rotating mechanism when the rack is discharged from the rack rotor mechanism is defined as a front face of the rack, the front face and the contact part have a first distance,
when the rotation holder is made parallel to the rack discharge mechanism, the first rack detector and an outer circumference of the rack rotor mechanism have a second distance, and
the second distance is not more than the first distance.

3. The connection module according to claim 2, comprising:
a second rack detector, wherein
when the rotation holder is made parallel to the rack discharge mechanism, the second rack detector is located in a remoter position from the rack rotor mechanism than a rotation axis of the rack rotating mechanism, and the second rack detector and the rotation axis have a third distance, and
the third distance is not more than the first distance.

4. The connection module according to claim 3, wherein either the first rack detector or the second rack detector depending on the selected rotation direction detects that the rack has been pushed out of the rotation holder to the conveyor mechanism.

5. The connection module according to claim 1, comprising:
a rack detector located before the discharge port to detect the rack discharged from the conveyor mechanism.

6. The connection module according to claim 1, wherein a waiting position for the carriage is provided between the rack rotor mechanism and the rack rotating mechanism, the connection module comprising:
a first carriage detector for detecting that the carriage is at a first stop position on a side of the rack rotor mechanism;
a second carriage detector for detecting that the carriage is at the waiting position;
a third carriage detector for detecting that the carriage is at a second stop position on a side of the rack rotating mechanism; and
a fourth carriage detector for detecting that the carriage is between the first stop position and an outer circumference of the rack rotor mechanism.

7. The connection module according to claim 6, wherein at the first stop position, the holding part of the carriage comes into contact with a contact part of the rack, and the second stop position is on a rotation axis of the rack rotating mechanism.

8. The connection module according to claim 7, wherein the rotation holder has a notch, and when the rotation holder becomes parallel to the feeder mechanism and the conveyor mechanism, the carriage can move from the second stop position through the notch to the waiting position.

9. An interference avoidance method for an automatic analyzer with a rack rotor mechanism and a connection module connected to the automatic analyzer, wherein
the automatic analyzer comprises a controller for controlling the rack rotor mechanism and the connection module,
the connection module comprises: a rack discharge mechanism for holding a rack from the rack rotor mechanism by a carriage and moving the rack to a rotation holder; and a rack rotating mechanism for rotating the rack moved to the rotation holder, and a distance between the rack rotor mechanism and the rack rotating mechanism is less than an overall length of the rack,
when the carriage is in a range of interference with the rack rotor mechanism, the controller moves the carriage to a first stop position on a side of the rack rotor mechanism, makes the rack rotating mechanism perform origin return operation, and then moves the carriage to a second stop position on a side of the rack rotating mechanism, and
if the carriage is out of the range of interference with the rack rotor mechanism but the rack is held by the carriage, the controller moves the carriage to the second stop position.

10. The interference avoidance method according to claim 9, wherein
the connection module comprises: an interference detector for detecting that the carriage is in the range of interference with the rack rotor mechanism; and a rack detector for detecting that at least part of the rack has moved to the rotation holder, and
the controller checks a state of interference between the automatic analyzer and the connection module according to output of the interference detector and output of the rack detector.

11. An interference avoidance method for an automatic analyzer with a rack rotor mechanism and a connection module connected to the automatic analyzer, wherein
the automatic analyzer comprises a controller for controlling the rack rotor mechanism and the connection module,
the connection module comprises: a rack discharge mechanism for holding a rack from the rack rotor mechanism by a carriage and moving the rack to a rotation holder; and a rack rotating mechanism for rotating the rack moved to the rotation holder, and a distance between the rack rotor mechanism and the rack rotating mechanism is less than an overall length of the rack,
the controller checks a stop position of the carriage and when the carriage is neither at a first stop position on a side of the rack rotor mechanism nor at a second stop position on a side of the rack rotating mechanism, the controller turns OFF excitation of a motor for rotating the rack rotating mechanism,
when the carriage is in a range of interference with the rack rotor mechanism, the controller moves the carriage to a waiting position between the rack rotor mechanism and the rack rotating mechanism,
the controller checks whether a rack is held by the carriage or not, and when the rack is held by the carriage, the controller moves the carriage to the second stop position and then turns ON the excitation of the motor for rotating the rack rotating mechanism.

12. The interference avoidance method according to claim 11, wherein the connection module comprises: a plurality of stop position detectors for detecting that the carriage is at the first stop position and at the second stop position, respectively; an interference detector for detecting that the carriage is in the range of interference with the rack rotor mechanism; and a rack detector for detecting that at least part of the rack has moved to the rotation holder, and the controller checks a state of interference between the automatic analyzer and the connection module according to output of the plural stop position detectors, output of the interference detector, and output of the rack detector.

* * * * *